Figures 1, 2:
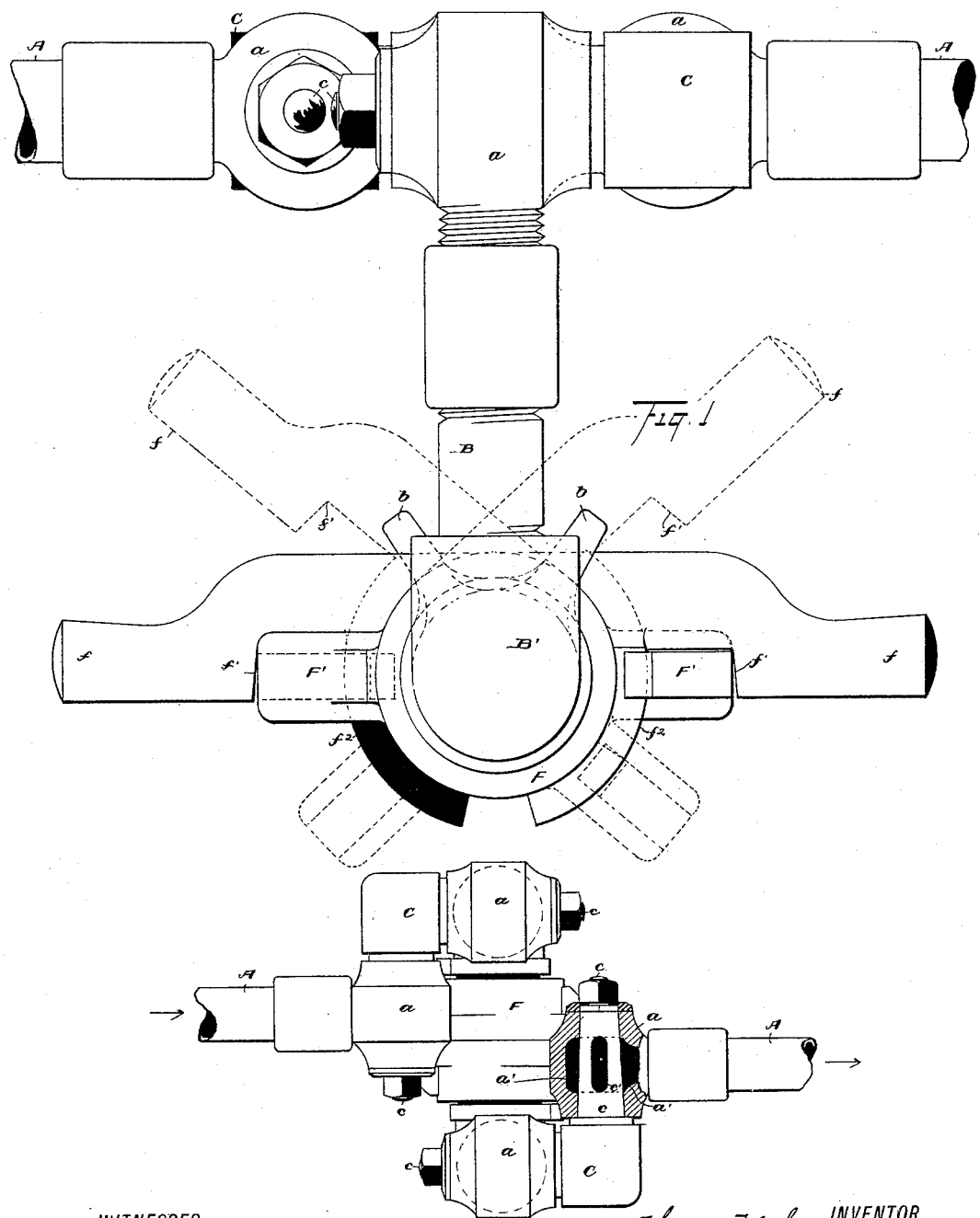

(No Model.) 2 Sheets—Sheet 1.

T. FLESHER.
PIPE COUPLING.

No. 399,661. Patented Mar. 19, 1889.

WITNESSES. INVENTOR.
Thomas Flesher
Liggett & Liggett Attorney.

(No Model.) 2 Sheets—Sheet 2.
T. FLESHER.
PIPE COUPLING.
No. 399,661. Patented Mar. 19, 1889.
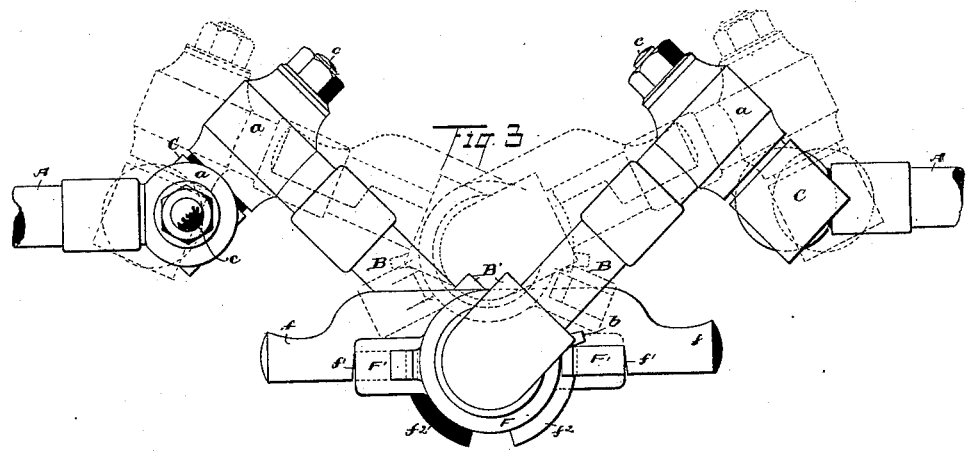
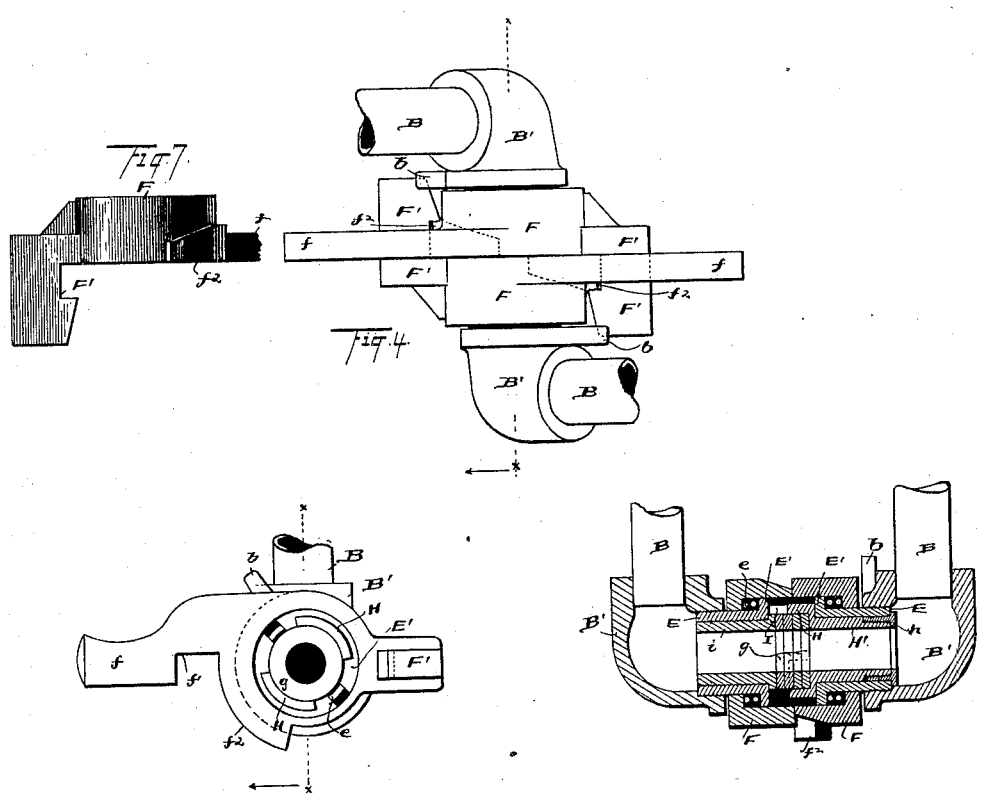
WITNESSES
N. S. Amstutz
Geo. W. King
Thomas Flesher INVENTOR
By Leggett & Leggett Attorney

UNITED STATES PATENT OFFICE.

THOMAS FLESHER, OF DUNKIRK, NEW YORK.

PIPE-COUPLING.

SPECIFICATION forming part of Letters Patent No. 399,661, dated March 19, 1889.

Application filed November 7, 1887. Serial No. 254,545. (No model.)

*To all whom it may concern:*

Be it known that I, THOMAS FLESHER, of Dunkirk, in the county of Chautauqua and State of New York, have invented certain new and useful Improvements in Pipe-Couplings; and I do hereby declare the following to be a full, clear, and exact description of the invention, such as will enable others skilled in the art to which it pertains to make and use the same.

My invention relates to improvements in pipe-coupling, designed more especially for coupling pipe between different cars, in which, with the uncoupling and separation of the cars, the members of the pipe-coupling are automatically unlocked and separated.

My invention also relates to the details of construction hereinafter described and claimed.

In the accompanying drawings, Figure 1 is a side elevation, and Fig. 2 a plan showing the position of the members of the pipe-coupling with the cars close together. Fig. 3 is a side elevation showing the coupling distended to the point of actuating the locking-levers in uncoupling, and Fig. 4 is a plan of the same. Fig. 5 is an inside elevation or end view of the one member of the coupling. Fig. 6 is an elevation in section on the line $x\,x$, Fig. 4. Fig. 7 is a bottom plan of a portion of one of the locking-levers, showing more especially the hook and locking-flange.

A represents pipes for conducting air, steam, water, &c., from one car to another, these pipes being permanently secured underneath and lengthwise of the respective cars. The pipes A at either end are provided with T's $a$.

B are short depending pipes provided at their upper ends also with T's $a$. These T's are bored laterally to receive the respective legs $c$ of elbows C. The T's are chambered at $a'$, and legs $c$ have openings $c'$. With such construction a universal joint and continuous passage-way is had between connected pipes A and B. This variety of universal joint, although well adapted to the purpose, is not essential, as other varieties of universal joint would answer the purpose. The lower ends of pipes B are provided with elbows B', the open ends thereof of opposing elbows presenting toward each other.

Sleeves E screw into the end of the respective elbows B', and on these sleeves are journaled, respectively, locking-levers F. Sleeves E have integral external collars, E', and between the collars and the respective locking-levers are located stiff spiral springs $e$, coiled around the sleeve, the tension of these springs tending to press the locking-levers against the adjacent elbows. Each lever F is provided with hook F', projecting toward the opposing member of the coupling, and with handle $f$ and with notch $f'$ for the hook of the opposing lever to enter, and with segmental flange $f^2$ for engaging the opposing hook. Flanges $f^2$ have flat faces, but are wedge-shaped on the back side, the points of the flange being thinner than the heel thereof, (see Fig. 7,) by reason of which in locking the levers the latter are drawn toward each other.

In Fig. 1 in solid and dotted lines are shown, respectively, the locked and unlocked positions of the levers. With the handles $f$ in their elevated position, the hooks F' will be correspondingly depressed, and the points of the flanges $f^2$ will be separated, so as not to engage the hooks. In such position of parts the members of the coupling may be placed together, or, having been placed together, may draw apart. The two members of the coupling having been brought together by depressing handles $f$, flanges $f^2$ are depressed and hooks F' are elevated, by reason of which the hooks and flanges engage and interlock. When the levers reach the approximately horizontal position shown in solid lines, Fig. 1, the levers engage and stop the opposing hooks, the hooks having entered the notches $f'$, and by reason of the wedge-shaped feature of the flanges $f^2$ aforesaid the two levers are drawn toward each other, thereby compressing springs $e$, and the tension of the springs hold the two members of the coupling in firm contact, so as to insure a tight joint. Levers F being, as aforesaid, journaled on sleeves E, pipes B and the rigidly-attached members of the coupling may turn from the position shown in solid lines, Fig. 1, to the position shown in solid lines, Fig. 3, without unlocking the levers, and such extension of the device is something more than enough to accommodate the separation of the cars in starting caused by the extension of the draw-bar. For unlocking the levers, lugs $b$ are connected with elbows B' in position to engage opposing hooks F' when the device has reached the degree of extension shown in solid lines, Fig. 3.

With a further extension of the device, as would be the case with the cars uncoupled and moving apart, hooks F' by their engagement with lugs $b$ are depressed until the levers reach the position shown in dotted lines, Fig. 1, whereupon the two members of the coupling become unlocked and are free to separate.

In dotted lines, Fig. 3, is shown the position of parts with levers F turned part way, but not quite enough to unlock the coupling.

Rubber gaskets $g$ are provided to insure a tight joint between the two members of the coupling, and to prevent these gaskets from abrasion, such as would be caused by the turning of one gasket upon the other in expanding and collapsing the device, I provide the following: Each member of the coupling is provided with a segmental flange, respectively, H and I, projecting from the face thereof. Within these flanges are crowded in the gaskets $g$, so that the latter will remain in place when the coupling is uncoupled. Flanges H and I interlock when brought together, which of course prevents the packing from turning the one gasket on the other, and at least one of these flanges is adapted to turn on its own axis independent of the turning of the member of the coupling with which it is connected. The revolving flange, which I will suppose is the flange H, is integral with tube H', the latter being fitted nicely in the bore of the contiguous sleeve E, so as to turn easily. Some means must be provided for holding tube H in place endwise. The device shown for this purpose is a flange-collar, $h$, the flange thereof screwing onto the inner end of tube H' and the collar overlapping the end of sleeve E. Lock-nuts and various devices would answer the same purpose.

The end bearings of sleeve H', including collar $h$, or whatever may serve for the purpose, should be ground joints to prevent leakage. Notches $e'$ (see Fig. 5) in collar E' are for receiving a tool, by means of which sleeve E is screwed into the elbow, tube H' having previously been secured in the sleeve. Flange I is shown integral with tube $i$, the latter being driven or screwed in tight into sleeve E. Flange I might be cast integral with sleeve E and collar E', if so preferred. The tension of spring $e$ retains levers F in the position in which they were separated, and consequently in position for coupling. Flange H is turned with the fingers until it is in position for interlocking the flange I. Flange H, however, will usually retain its position when unlocked, so that the parts would come together without manipulation.

When the two members of the coupling are brought together, they are locked in a moment by depressing the levers, after which no further attention is required, the unlocking and separation of the coupling being, as aforesaid, done automatically.

What I claim is—

1. In pipe-coupling of the variety indicated, the combination, with locking-levers, of lugs or stops connected with the respective members of the coupling for engaging and automatically unlocking the levers when the coupling shall have reached a predetermined degree of extension, substantially as set forth.

2. In pipe-coupling, the combination, with locking-lever, substantially as indicated, of spring for engaging and pressing the levers apart and thereby drawing the members of the coupling toward each other, substantially as set forth.

3. In pipe-coupling, the combination, with locking-levers and springs, substantially as indicated, of wedge-shaped flanges for engaging the hook of opposing locking-levers, whereby in locking the levers the springs are compressed, substantially as set forth.

4. The combination, with pipe-coupling, substantially as indicated, of segmental flanges projecting from the face of the respective members of the coupling, said flanges being adapted to interlock, and one flange having a journal bearing in the supporting member of the coupling, substantially as set forth.

In testimony whereof I sign this specification, in the presence of two witnesses, this 26th day of October, 1887.

THOMAS FLESHER.

Witnesses:
F. E. VAN DEVORT,
W. T. COLMAN.